July 3, 1962 — E. C. NORDELL — 3,042,915
SIGNAL PROCESSING ARRANGEMENT
Filed April 9, 1957 — 2 Sheets-Sheet 1

INVENTOR:
EUGENE C. NORDELL,
BY Michael Masnik
HIS ATTORNEY.

July 3, 1962      E. C. NORDELL      3,042,915
SIGNAL PROCESSING ARRANGEMENT
Filed April 9, 1957      2 Sheets-Sheet 2

INVENTOR:
EUGENE C. NORDELL,
BY Michael Masnik
HIS ATTORNEY.

United States Patent Office 3,042,915
Patented July 3, 1962

3,042,915
SIGNAL PROCESSING ARRANGEMENT
Eugene C. Nordell, North Syracuse, N.Y., assignor to General Electric Company, a corporation of New York
Filed Apr. 9, 1957, Ser. No. 651,762
9 Claims. (Cl. 343—7.7)

My invention relates to signal processing arrangements and more particularly to an arrangement for discriminating between moving and fixed objects in an object detection system.

A well-known technique in the art of object detection, particularly of the type employing recurrent transmission of pulses of energy, is the employment of a time delay circuit in order to permit discrimination between moving and fixed objects. The time delay circuit permits comparison of two or more successive echo returns from remote objects which have been irradiated by the transmitted pulses. In order to discriminate more completely against fixed and slowly moving objects, a well-known technique employs two or more of these time delay circuits in cascade. Unfortunately, however, the delay lines and their associated circuitry are complicated and expensive. Where more than one such time delay circuit is employed in cascade, this expense is multiplied because the individual delay circuits now must maintain a small tolerance relative to the other delay circuits.

Accordingly, it is an object of my invention to provide a useful signal processing arrangement.

Another object of my invention is to provide a novel arrangement permitting discrimination between fixed and moving objects at a carrier frequency.

Another object of my invention is to provide a novel arrangement permitting discrimination between moving and fixed objects in an object detection arrangement.

Another object of my invention is to provide a signal processing arrangement capable of simplified operation.

Another object of my invention is to provide novel fixed object discrimination in a moving object indicator arrangement.

In accordance with one embodiment of my invention applicable to moving object indication arrangements, an arrangement comprising a synchronous detector is substituted for the final time delay circuit normally included in a cascade echo cancellation system.

The features of the present invention which are believed to be novel are particularly pointed out in the appended claims.

Figure 1:
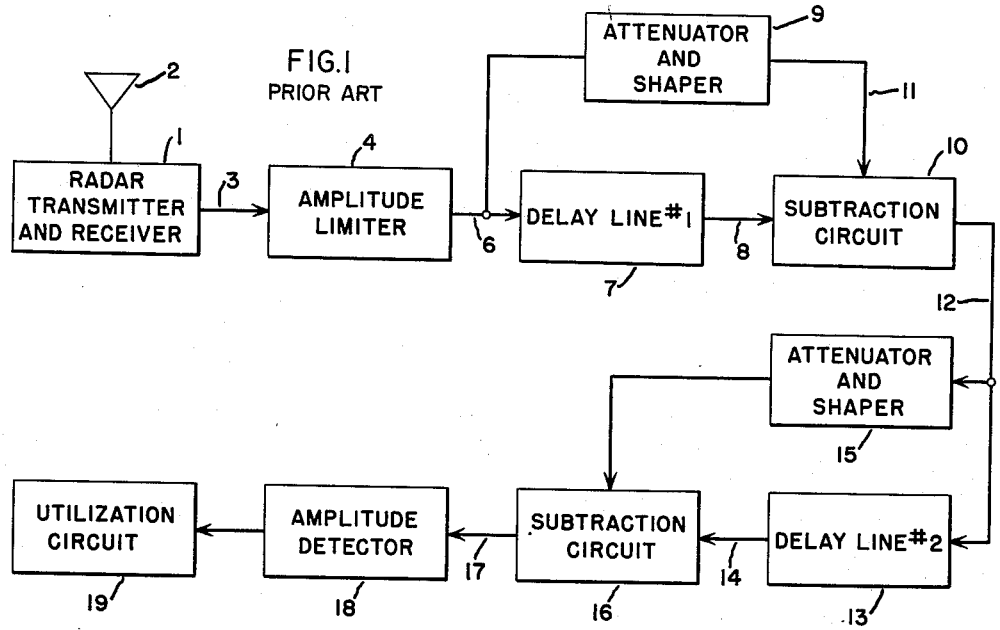
FIG. 1 shows in block diagram form a cascade cancellation moving object indication arrangement of the prior art.
Figure 2:
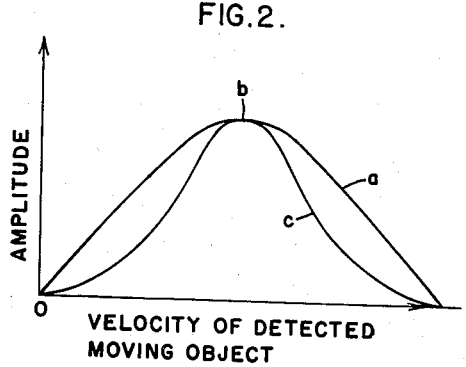
FIG. 2 illustrates graphically velocity response characteristics of moving object indication arrangements.

Referring to FIG. 1, there is shown a moving object indication arrangement of the prior art applicable to remote object detection schemes of the radar type. High powered radar pulses generated in the transmitter portion of the transmitter-receiver 1 are transmitted by means of the directive radiation pattern of the antenna 2 toward remote objects in space. In turn, the pulses reflected from a remote object are received by the antenna 2 and processed by the receiver portion of the transmitter-receiver 1 to yield echo pulses at a carrier, or intermediate frequency level over lead 3. The echo signals at the carrier frequency level are amplitude limited by 4 and applied over lead 6 to a first time delay circuit 7. The limiting level of circuit 4 is normally established to insure that the residue from unwanted fixed echo returns, as measured at point 19, will not exceed the system receiver noise level. The purpose of this adjustment is to provide optimum sub-clutter-visibility of the moving object indicating system. Sub-clutter-visibility being defined as the ability to detect moving objects in the presence of fixed objects. Time delay circuit 7 provides at its output lead 8 a carrier frequency echo signal with a time delay corresponding to the period between two successive pulses transmitted by the radar transmitter 1. Limited echoes from circuit 4, at the carrier frequency, are also applied directly through the amplitude attenuator and frequency response shaping circuit 9 to the subtraction circuit 10 for comparison with the time delayed echoes available from circuit 7. Thus the subtraction circuit is provided with an undelayed echo and an echo delayed by a single pulse recurrence period. Upon subtraction of the signals available over leads 8 and 11, the subtraction circuit yields echoes, at the carrier frequency level, at its output lead 12 which have been discriminated against on an electrical phase and amplitude differential basis, the differential phase of said carrier frequency echoes being a function of the distant object's radial velocity with respect to the radar antenna 2. Thus echoes received from fixed objects having no radial velocity and consequently no electrical phase differential will have been cancelled out by the subtraction circuit such that only echoes from moving objects are presented over lead 12. Referring to FIG. 2, there is shown a graph useful in explaining the operation of a dual cancellation arrangement. In FIG. 2 the radial velocity of a detected moving object is plotted as abscissa and the amplitude of the echo signals available on lead 12 as the ordinate, for a constant amplitude input being supplied at 3. Use of a single delay line cancellation system similar to that heretofore described in connection with FIG. 1 yields a response characteristic such as that labeled $a$. This is recognized as a trigonometric sine function. It is seen that objects of zero radial velocity provide no output on lead 12. It is seen that for any object of velocity greater than zero and less than $$V = \frac{\lambda}{2t}$$

an output is provided over lead 12. This output has an amplitude characteristic which varies with the radial speed of the moving object. The characteristic is maximum at $b$, which point corresponds to a velocity (V) which equals the wavelength ($\lambda$) of the transmitted radar pulses divided by 4T, $$\left(\text{i.e., } V = \frac{\lambda}{4T}\right)$$

where T is the period between transmitted pulses or that of the delay line 7.

Inspection of curve $a$ reveals an appreciable output close to zero velocity. It is preferable that the characteristic be modified to discriminate still further against slowly moving objects, such as trees, etc. which are being moved by wind forces.

A characteristic such as that shown at $c$ in FIG. 2 would be desirable. This is easily recognized as a trigonometric sine squared function. A response, such as that shown at $c$, can be obtained by introducing a second echo cancellation stage similar to that heretofore described in connection with FIG. 1 and operating said stages in cascade. Referring back to FIG. 1, the echo pulses at the intermediate frequency, or carrier frequency, level which have been discriminated against on the basis of radial velocity are applied from lead 12 through a second delay line 13 similar to that of 7 and having a time delay equal to the pulse recurrence period, resulting in the aforesaid velocity discriminated pulses appearing at the carrier frequency on lead 14 with another complete repetition period delay. The same carrier frequency signals available on lead 12 are also applied directly through the attenuator and shaper circuit 15 to the subtraction circuit 16. Circuit 15 functions in a manner identical to that previously described in connection with block 9. Subtraction circuit 16 subtracts the delayed and undelayed carrier frequency signals available from delay line 13 and shaper 15 to provide echoes on lead 17 which have been further discriminated against on the basis of radial velocity. The doubly cancelled echoes available on lead 17 are amplitude detected in circuit 18 and are there applied to a utilization circuit 19. Utilization circuit 19 may comprise a cathode ray tube type presentation upon which only those echoes corresponding to moving objects made available from detector 18 are displayed. The echo display available at the cathode ray tube corresponding to utilization circuit 19 will produce moving object information from which has been eliminated a substantial amount of fixed and slowly moving objects. This can readily be noted by reference to FIG. 2 heretofore described.

Figure 3:
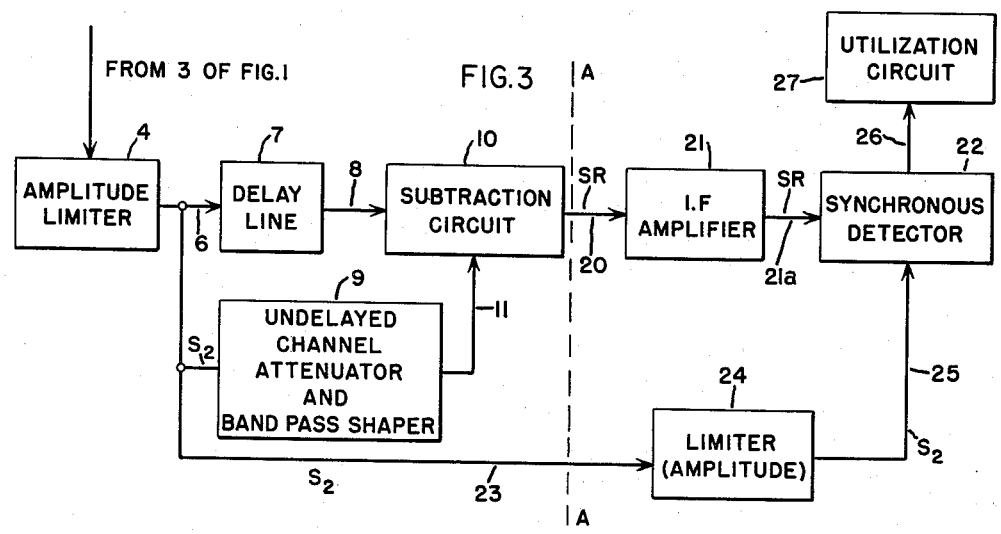
FIG. 3 illustrates in block diagram form the present invention.

As mentioned previously, it is desirable to reduce the circuitry and cost of the dual cancellation arrangement by eliminating the need for the second delay line. This can be accomplished in accordance with one embodiment of the present invention as shown in FIG. 3. In FIG. 3, elements common to that shown in FIG. 1 have been retained with the same reference numerals wherever possible. Thus radar echoes at the carrier frequency level are amplitude limited in 4 as previously noted and applied through a delay line (7), which introduces a time delay corresponding to the recurrence period of successively transmitted radar pulses, to the subtraction circuit 10. Undelayed echoes at the carrier frequency level are applied directly through the attenuator and shaper circuit 9 to the subtraction circuit 10 for subtraction from the time delayed signals available from delay line 7. Instead of employing a second delay line as shown in FIG. 1, the novel scheme shown to the right of the dotted line AA is employed. Echoes from remote object, after having undergone a single cancellation at the carrier frequency level, are applied over lead 20 to an amplifier 21 where they are amplified to a suitable level before application to a synchronous detector 22 for phase comparison. The undelayed signals available from the amplitude limiter 4 are applied over lead 23 to an amplitude limiter 24 before application over lead 25 to the synchronous detector 22. The operating level of the amplitude limiter 24 is set to insure that the undelayed signals available on lead 25 carry no amplitude modulation information. In effect therefore the signals on lead 25 correspond to echo signals at the IF level in which only phase information has been retained. The function of the synchronous detector 22 is to compare and provide an output corresponding to the difference in phase between the signals available from the amplifier 21 and those available on lead 25. Synchronous detector 22 yields a video output on lead 26 whose amplitude is proportional to the sine of the difference in electrical phase angle between the singly cancelled echo return and the uncancelled echo return available on lead 25.

Figure 6:
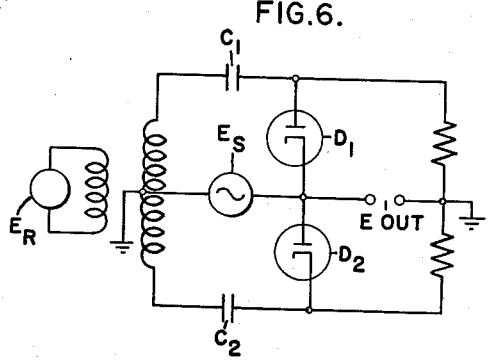
FIG. 6 illustrates, schematically, the operation of a synchronous detector useful in explaining the invention.

The detector 22 is well known in the prior art. One such detector is illustrated schematically in FIG. 6 wherein the reference voltage $E_R$ is available in the circuits containing diodes $D_1$ and $D_2$ with the same phase. $E_S$, the incoming signal, is made available at $D_1$ with a phase difference of 180° with respect to that made available at $D_2$. Capacitors $C_1$ and $C_2$ are alternating current filtering capacitors. The diodes $D_1$ and $D_2$ rectify the applied signals such as to provide at E out a video signal signal having an amplitude proportional to the trigonometric cosine function of the phase angle between $E_S$ and $E_R$. Introduction of a 90° phase shift between $E_S$ and $E_R$ before applying them to the synchronous detector 22 would then result in an output which is a sinusoidal function of the phase relation of the two input signals as illustrated in FIG. 2.

Figure 4A:
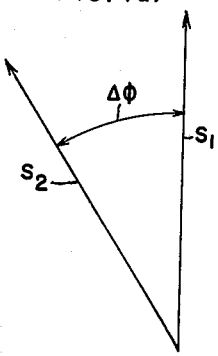
FIGS. 4a, 4b and 5 are illustrations useful in explaining the present invention.
Figure 4B:
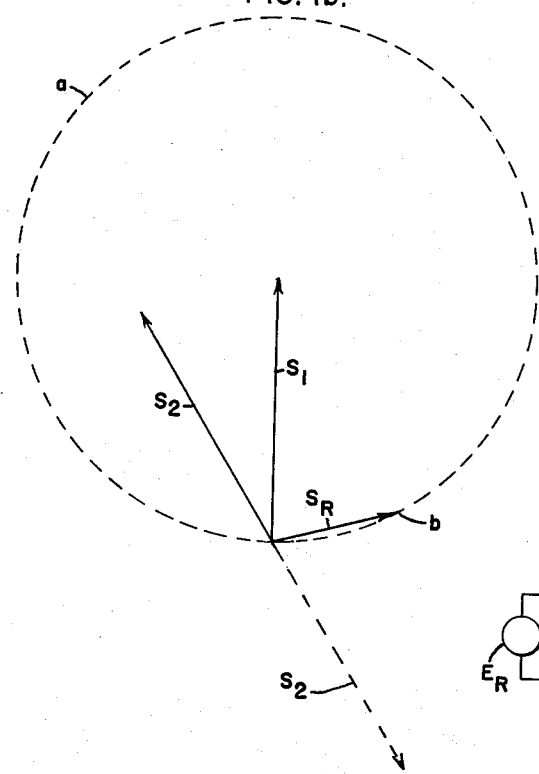
Figure 5:
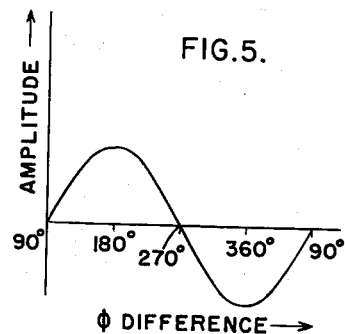

For further explanation of this feature of the invention, reference is made to the vectoral illustrations of FIG. 4a wherein $S_1$ corresponds to the echo returned from a first pulse period and $S_2$ corresponds to an echo returned from the next pulse period. Since the object is moving between subsequent pulse periods, a phase change identified as $\Delta\phi$ is introduced. For purposes of discussion, it is assumed that the signal $S_1$ has been applied through delay line 7, FIG. 3, to the subtraction circuit 10 and the signal $S_2$ has been applied directly through channel 9 to the circuit 10 such that at lead 20 there is provided a signal $S_R$ as shown in FIG. 4b. The one hundred and eighty degree phase shift corresponding to $S_2$ shown in dotted line form in FIG. 4b has been introduced by the circuit 9 for subtraction purposes in circuit 10. The synchronous detector compares the relative phase of signal $S_R$ available on lead 21a with the undelayed limited signal $S_2$ available on lead 25. The signal ($S_2$) in effect corresponds to a reference phase signal. It can be further shown (see FIG. 4b) that the relative phase of the signal $S_R$ available on lead 21a and the undelayed signal on lead 25 will vary between the limits of +90° and +270°. Line $a$ (a circle) is the locus which would be generated by the tip ($b$) of the $S_R$ vector as $S_2$ is rotated through 360°. Thus, the phase relationship of the two signals applied to the synchronous detector 22 is established. The characteristic of the synchronous detector 22 is similar to that shown in FIG. 5, wherein the phase difference of the applied signals is plotted as abscissa and the resultant output of the phase detector is plotted as ordinate. Inspection of FIG. 5 indicates that a further discrimination on the basis of radial velocity is accomplished as follows. Fixed and slow moving object echoes will yield a signal $S_R$ (FIG. 4b), with a phase relative to $S_2$, of approximately 90° or 270°. FIG. 5 shows that the output amplitude of objects in this category will be small, while higher speed objects will yield a signal $S_R$ with a phase relative to $S_2$ of approximately 180° which results in a large amplitude output from the synchronous detector 22.

The velocity response curve of the synchronous detector is the characteristic sine function and, therefore, accomplishes the same result as the conventional delay line canceller, providing that the object echoes contain phase information only and are not amplitude modulated.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a moving object indicator arrangement for use in a pulse echo object detector comprising means for periodically transmitting pulses at a carrier frequency to remote objects in space, means for receiving echoes at a carrier frequency of said pulses returned from said objects, a first delay device responsive to received echoes at a carrier frequency for providing said received echoes with a time delay corresponding to that between successively transmitted pulses, means for subtracting said delayed and undelayed received echoes to provide difference signals, means for amplitude limiting undelayed received echoes at a carrier frequency, a synchronous detector adapted to provide a video frequency output signal having an amplitude dependent upon the relative phases of applied carrier frequency signals, said detector responsive to the relative phase of said difference signals and said carrier frequency amplitude limited echoes for providing phase compared signals at a video frequency level, and means for utilizing said last-named phase compared signals.

2. In combination, a moving object indicator arrangement for use in a pulse echo object detector comprising means for periodically transmitting pulses at a carrier frequency to remote objects in space, means for receiving echoes at a carrier frequency of said pulses returned from said objects, a first delay line responsive to received echoes at a carrier frequency for providing said received echoes with a time delay corresponding to that between successively transmitted pulses, means for subtracting said delayed and undelayed received echoes to provide first resultant echoes at a carrier frequency level, means for amplitude limiting said undelayed received echoes at a carrier frequency, a synchronous detector responsive to the relative phase of said resultant echoes and said amplitude limited echoes for providing phase compared signals at a video frequency, and means for utilizing said phase compared signals.

3. In combination, a source of recurrent carrier frequency input signals, a first signal delay circuit responsive to said input signals for providing said carrier frequency input signals delayed by a single recurrence period, means for subtracting said delayed and undelayed carrier frequency input signals to provide difference signals, means responsive to the relative phase of said difference signals and said undelayed input signals to provide second resultant signals.

4. In combination, a source of periodic carrier frequency input signals, a first signal delay circuit responsive to said input signals for providing said carrier frequency input signals delayed by a single period of said input signals, means for subtracting said delayed and undelayed carrier frequency input signals to provide difference signals, means responsive to the relative phase of said difference signals and said undelayed input signals to provide second resultant signals at a video frequency, and means for utilizing said video frequency signals.

5. In combination, a source of periodic carrier frequency pulses undergoing phase modulation, a first delay line responsive to pulses from said source for providing carrier frequency output pulses delayed by a single repetition period, means for comparing said delayed output pulses with undelayed pulses from said source to provide first resultant carrier frequency pulses, a synchronous detector responsive to the relative phase of said first resultant carrier frequency pulses and said undelayed pulses from said source to provide second resultant pulses at a video frequency level, and means for utilizing said second resultant pulses.

6. In combination, a source of recurrently phase modulated signals of a carrier frequency, a first signal delay device responsive to said recurrently modulated signals for providing said recurrently modulated signals delayed by a predetermined recurrence period, means for providing a signal representing the difference of said delayed and undelayed recurrently modulated signals, means responsive to the relative phase of said difference signals and said undelayed recurrently modulated signals to provide second resultant signals, and means for utilizing said second resultant signals.

7. In a pulse-echo moving object indicator arrangement wherein echoes are recurrently returned from remote objects in space, a plurality of echo discrimination circuits connected in cascade and adapted to time delay return echoes and to compare said time delayed echoes with relatively undelayed returned echoes at a carrier frequency level to provide a resultant signal at a carrier frequency level, and a synchronous detector comprising the final one of said circuits for comparing the phase of resultant signals and undelayed echoes to provide a video frequency output signal.

8. In combination, a source of periodic signal pulses undergoing phase modulation, a first delay device responsive to pulses from said source for providing said pulses delayed by a single period of said signals, means for providing signals representing the difference of said delayed and undelayed pulses, a synchronous detector responsive to the relative phase of said difference signals and undelayed pulses from said source to provide second resultant pulses, and means for utilizing said second resultant pulses.

9. In combination, a plurality of carrier frequency signal processing circuits connected in cascade so as to provide a resultant output signal in response to an applied input signal, each of said circuits comprising means to time delay an input signal and means to compare said time delayed input signal with its undelayed input signal so as to provide compared signals at a carrier frequency level, and a synchronous detector connected to compare the phase of said resultant output signal with the input signal of any of said circuits to provide an output signal at a video frequency level.

References Cited in the file of this patent
UNITED STATES PATENTS

| | | |
|---|---|---|
| 2,426,187 | Earp | Aug. 26, 1947 |
| 2,659,079 | Cunningham | Nov. 10, 1953 |